United States Patent
Hamilton

(10) Patent No.: US 8,258,994 B2
(45) Date of Patent: Sep. 4, 2012

(54) IR JAMMING SYSTEM FOR DEFENSE AGAINST MISSILES WITH IR-SENSITIVE HOMING HEADS

(75) Inventor: Colin Hamilton, Blaustein (DE)

(73) Assignee: EADS Deutschland GmbH, Ottobrunn (DE)

(*) Notice: Subject to any disclaimer, the term of this patent is extended or adjusted under 35 U.S.C. 154(b) by 210 days.

(21) Appl. No.: 12/120,359

(22) Filed: May 14, 2008

(65) Prior Publication Data

US 2009/0015458 A1 Jan. 15, 2009

(30) Foreign Application Priority Data

May 15, 2007 (DE) .......................... 10 2007 022 820

(51) Int. Cl.
*H04K 3/00* (2006.01)
*G01S 7/38* (2006.01)
*G01S 7/00* (2006.01)
*F41G 7/00* (2006.01)

(52) U.S. Cl. ............. 342/14; 342/13; 455/1; 250/493.1; 250/503.1; 250/504 R; 398/39; 244/3.1; 244/3.15; 244/3.16

(58) Field of Classification Search ............ 244/3.1–3.3; 455/1; 342/13–16; 89/1.11; 398/178, 39; 340/981; 250/493.1, 494.1, 495.1, 503.1, 250/504 R, 504 H
See application file for complete search history.

(56) References Cited

U.S. PATENT DOCUMENTS

| | | | |
|---|---|---|---|
| 3,836,968 A * | 9/1974 | Schillreff | 342/15 |
| 4,744,088 A | 5/1988 | Heinen et al. | |
| 5,061,930 A | 10/1991 | Nathanson et al. | |
| 5,497,156 A * | 3/1996 | Bushman | 89/1.11 |
| 6,359,710 B1 * | 3/2002 | Takken et al. | 398/178 |
| 6,420,718 B1 * | 7/2002 | Kreick | 250/504 R |
| 6,420,719 B1 * | 7/2002 | Johnson | 250/504 R |
| 6,420,720 B1 * | 7/2002 | Rubin | 250/504 R |
| 6,429,446 B1 * | 8/2002 | Labaugh | 250/504 R |
| 6,587,486 B1 | 7/2003 | Sepp et al. | |
| 2008/0088496 A1 | 4/2008 | Thum-Jaeeger et al. | |

FOREIGN PATENT DOCUMENTS

| | | |
|---|---|---|
| DE | 197 45 785 A1 | 4/1999 |
| DE | 199 38 398 A1 | 9/2002 |
| DE | 103 49 869 A1 | 6/2005 |
| EP | 0 237 812 A2 | 9/1987 |
| FR | 2679664 A1 * | 1/1993 |

OTHER PUBLICATIONS

European Search Report dated Oct. 27, 2008 with partial English translation (Eighteen (18) pages).
Germany Office Action dated Jun. 20, 2008 with English translation (Four (4) pages).
"Directional Infrared Counter Measures", Wikipedia, The Free Encyclopedia, XP002498701.
AN/AAQ-24 Directional Infrared Countermeasures (DIRCM), Internet Article, XP002498702.
"AN/AAQ-24(V) NEMESIS Directional Infrared Countermeasures (DIRCM)", Northrop Grumman Product & Solutions Brochure, XP002498703.

* cited by examiner

*Primary Examiner* — Bernarr Gregory
(74) *Attorney, Agent, or Firm* — Crowell & Moring LLP

(57) ABSTRACT

In an IR jamming system for defense against missiles with IR-sensitive homing heads, one or more jamming beams are generated, whose diameter is less than that of the optical aperture of the IR-sensitive homing head of the missile. The optical aperture of the IR-sensitive homing head of the missile is at least partially illuminated by the jamming beam or beams.

12 Claims, 3 Drawing Sheets

Fig. 3
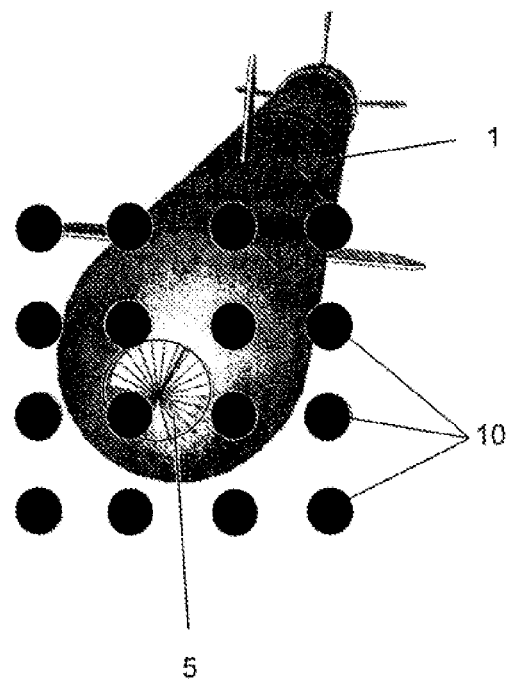
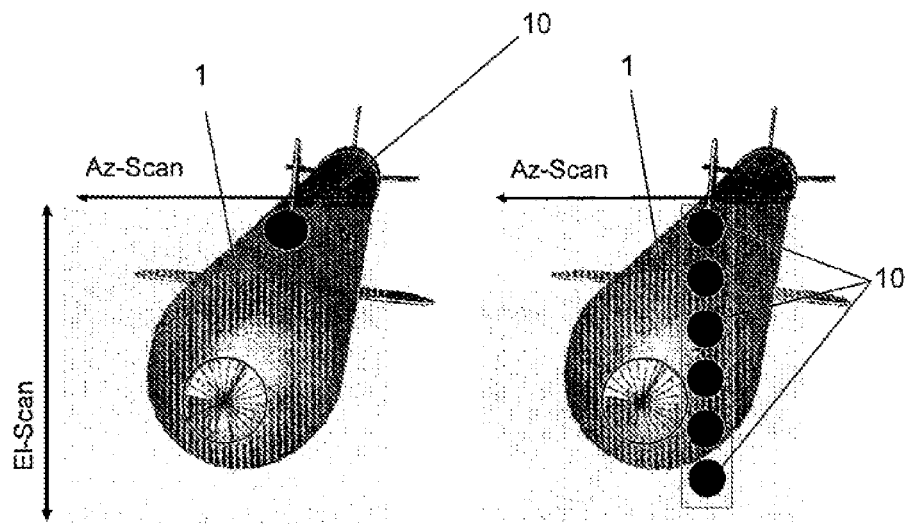
Fig. 5A					Fig. 5B

IR JAMMING SYSTEM FOR DEFENSE AGAINST MISSILES WITH IR-SENSITIVE HOMING HEADS

BACKGROUND OF THE INVENTION

This application claims the priority of German patent document number 10 2007 022 820.3-15, filed May 15, 2007, the disclosure of which is expressly incorporated by reference herein.

The invention relates to an IR jamming system for defense against missiles which are equipped with IR-sensitive homing heads.

Such missiles are a major threat to military aircraft, and increasingly to civil aircraft as well. The homing heads operate by tracking and aiming at the heat which is produced by the aircraft engines, by frictional heating of the aircraft structure, or by reflection of solar radiation on parts of the aircraft structure.

Known and established measures against IR-sensitive homing heads include decoy flares, which are ejected by the aircraft to be protected, and active IR jammers which emit a powerful beam of modulated IR power in the direction of the approaching missile.

One application for active IR jammers is to dazzle the homing head, or to saturate it, by high-power radiation. This method is very robust, but countermeasures are known which at least reduce the jamming effect.

According to a further application of active IR jammers, the aim is to produce an error in the internal target tracking algorithm of the missile by means of modulated radiation. This operates well against homing heads which carry out a time-based angle measurement, but is less effective (or is even completely ineffective) against homing heads with a fixed search field (so-called staring sensors). In the latter case, this jamming measure may even be counterproductive since it offers a powerful beacon signal for the homing head. In addition, this method results in further problems when a multiplicity of different search-head types must be engaged at the same time.

Known active IR jammers, for example the NEMESIS infrared jamming system from Northrop-Grumman, transmit a broad beam 10 with a relatively wide beam angle which is a multiple of the diameter of the missile 1 (FIG. 1). The beam diameter at distances of 1 to 2 km is typically more than 2 m. This broad jamming beam 10 ensures that a planar wave enters the homing head optics 5, where it is focused on a detector element or detector array. A simple, low-accuracy passive tracking system can be used to aim the beam for this application. However, when the missile turns away from the beam, the jamming beam is greatly attenuated, and the jamming effect is lost.

SUMMARY OF THE INVENTION

One object of the invention is to provide a method and apparatus which are effective against all homing head types and which require comparatively low-power radiation.

This and other objects and advantages are achieved by the IR jamming device according to the invention, in which IR jammers produce jamming beams with a very small diameter, specifically less than the optical aperture of the homing head. In a typical missile (so-called MANPAD missiles) which can be fired by a single person, this means that the jamming beam has a diameter of less than 6 cm. The illumination of the homing head is thus reduced to an area which is less than its optical aperture.

Since only a part of the lens system of the homing head is illuminated, the IR power is not focused on one point on the detector array but is in fact scattered in an unpredictable manner within the homing head, depending on the specifically illuminated area and the incidence angle of the radiation. The homing head receives sufficient energy to detect an incident signal as such, and attempts to track it. However, since it is impossible to derive any consistent angle information from the incident signal, this results in an incorrect angle measurement, and therefore incorrect target tracking.

Moreover, in contrast to the situation with the known jamming method with broad jamming beams, the jamming power according to the invention can still enter the sensor from angles away from the sensor viewing direction, so that the jamming effect is maintained when the missile turns away from the target.

The illumination according to the invention is advantageously carried out using laser radiation since, if non-coherent light were to be used, this may diffuse over the entire sensor aperture, so that the intended effect would be lost.

The solution according to the invention has the following advantages:

It can be used universally since it is effective against all types of tracking methods (that is, both scanning sensors and sensors with a fixed search field).
There is no need for extremely high radiated power levels.
The required power can be produced by a plurality of relatively low-power sources.
It offers the capability to produce the power in different wavelength ranges, with low-loss power combination in space.

Other objects, advantages and novel features of the present invention will become apparent from the following detailed description of the invention when considered in conjunction with the accompanying drawings.

BRIEF DESCRIPTION OF THE DRAWINGS

FIG. 3 shows the homing head being illuminated by an IR jammer in the form of a two-dimensional radiation pattern composed of individual jamming beams, according to the invention;

FIGS. 5(a) and (b) show the illumination, according to the invention, of a homing head by an IR jammer in the form of a high-speed scanning single jamming beam, and jamming beams arranged in a row, respectively.

DETAILED DESCRIPTION OF THE INVENTION

Figure 2:
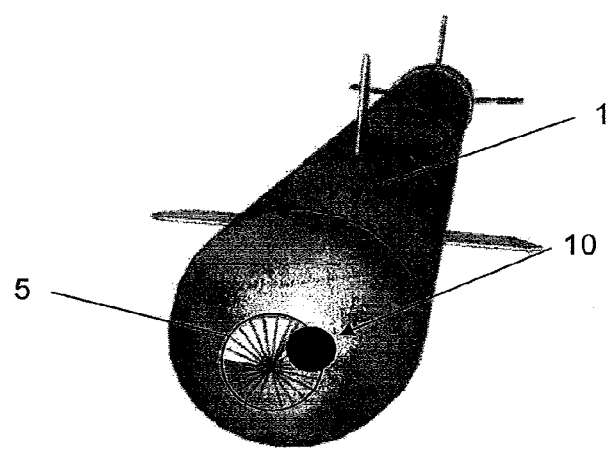
FIG. 2 shows the homing head being illuminated by an IR jammer in the form of a single, thin jamming bream according to the invention.

FIG. 2 shows the illumination according to the invention of the homing head of an enemy missile 1 by the radiation from an active IR jammer in the form of a single, thin jamming beam 10 according to the invention. As can be seen, the diameter of the jamming beam 10 on the surface of the homing head is less than the diameter of the optical aperture 5 (that is, the IR-transmissive optical window at the nose of the missile), and the jamming beam covers only a subarea of the optical aperture. This therefore makes it possible to achieve the jamming effect described above.

Figure 1:
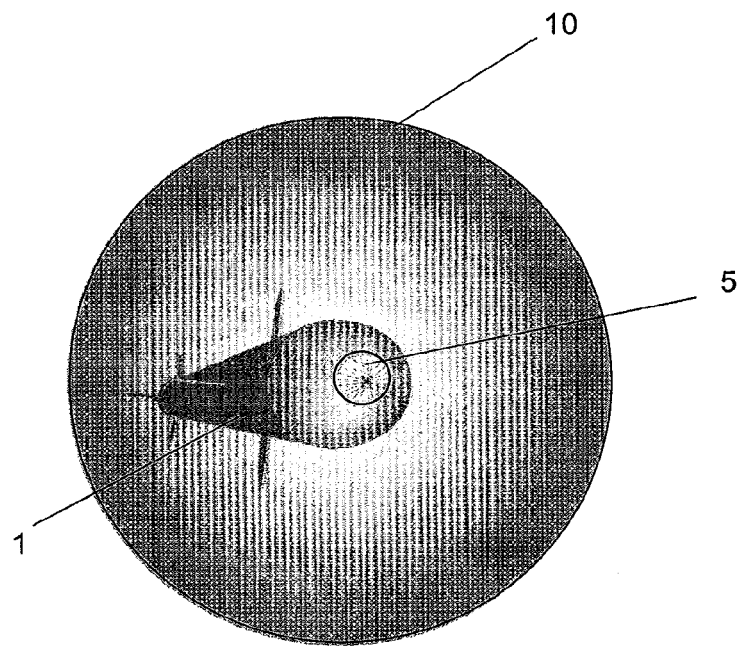
FIG. 1 shows a homing head being illuminated by an IR jammer according to the prior art.

Compared with the known illumination by means of a broad jamming beam (FIG. 1), the illumination according to the invention (FIG. 2) requires greater pointing accuracy in order to ensure that the jamming beam strikes the optical aperture of the homing head. For this reason, in one advantageous embodiment, a known radar tracker or laser tracker (in particular a so-called closed-loop laser tracker) may be used to aim the jamming beam, instead of a simple passive tracker.

In order to reduce the requirement for pointing accuracy, a two-dimensional (in cross section) pattern of the described jamming beams can be produced. FIG. 3 shows such a pattern of jamming beams 10, in this case in the form of a regular grid. The diameter of the individual jamming beams 10 on the surface of the missile 1 is less than the diameter of the optical aperture 5 of the homing head. This embodiment allows the jamming beam to be aimed less accurately since it is sufficient for the optical aperture 5 to be partially illuminated by just one beam 10 in order to achieve the desired jamming effect. The distance between the individual beams 10 is chosen such that the optical aperture of the homing head is partially illuminated by at least one beam, irrespective of where the missile 1 is located within the pattern.

Figure 4A:
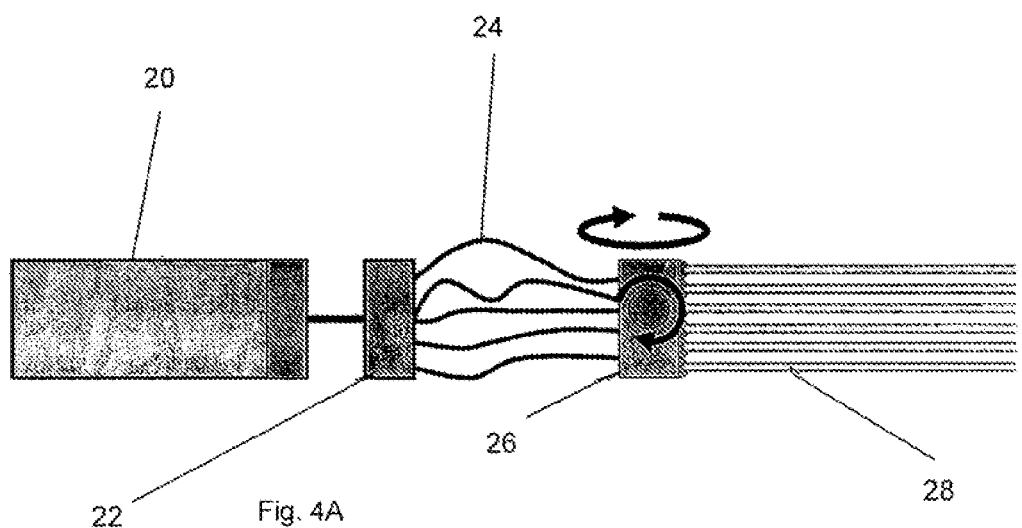
FIGS. 4(a) and (b) show two specific embodiments for beam generation according to the invention, including central power generation by a radiation source, and local power generation by means of a plurality of radiation sources, respectively.
Figure 4B:
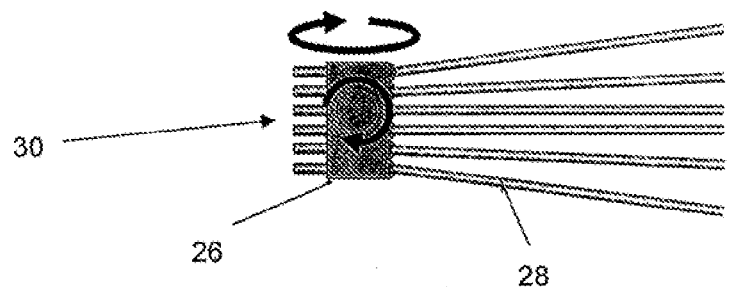

Such a pattern can be produced by different configurations, for example:
   a) by means of a central high-power laser which supplies a group of optical fibres that are themselves coupled to an optical lens array (FIG. 4a), or
   b) by means of an array of solid-state lasers, each of which has a comparatively low power (FIG. 4b).

FIG. 4a shows the use of a central laser 20 with an optical power splitter 22 and a multiplicity of optical fibres 24 which supply a two-dimensional lens system. In this case, each optical fibre 24 has one associated lens. The lenses are arranged on a gimbaled plate 26, which can be rotated both in azimuth and in elevation.

In FIG. 4b, the power is generated by an array of solid-state lasers 30, with each laser having its own dedicated associated lens on the gimbaled plate 26.

In both cases, the beams 28 may be emitted either parallel to one another at a specific constant distance apart, or such that they diverge, with the divergence increasing at the edges.

FIG. 4a shows a parallel emission and FIG. 4b shows divergent emission. In the latter embodiment, the degree of divergence is chosen such that the distance between the beams does not increase excessively with the distance from the jammer.

In a further embodiment, the pattern described above can be extended to a multi-band pattern by interleaving a plurality of patterns at different wavelengths in one another. This means that the beams from one pattern are arranged in the gaps which exist between the individual beams of the other pattern. The beams within the same pattern are characterized in that they are all at the same wavelength (or in the same wavelength band). The patterns are in turn characterized by a specific wavelength (or wavelength band) which differs from the wavelengths of the other patterns.

A further possible way to reduce the requirement for the directional accuracy of the IR jammer is to scan a single high-power beam, or alternatively a plurality of high-power beams, very quickly over a spatial area in which the enemy homing head is approximately located. This allows sufficient energy to be supplied to the homing head to achieve the jamming effect, but without allowing the homing head to carry out constant angle tracking.

FIGS. 5(a) and (b) show the two embodiments that have been mentioned. FIG. 5(a) shows a single beam 10 which can be aimed in azimuth and elevation. This allows the illustrated spatial area in which the missile is approximately located to be scanned very quickly. The approximate position of the missile 1 can be determined, for example, by a simple, passive, low-accuracy tracking system.

FIG. 5(b) shows a plurality of beams 10 arranged in a row and which can be scanned together in a spatial direction. This allows the illustrated spatial area in which the missile 1 is approximately located to be scanned very quickly.

In an alternative embodiment, a two-dimensional pattern of jamming emitters can also be produced by interference between the radiation from two coherent sources.

In a further embodiment, a two-dimensional radiation pattern is produced by diffraction on a diffraction structure, for example on a grating.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An IR jamming system for defense against a missile with an IR-sensitive homing head by emitting jamming radiation, wherein:
   the IR jamming system produces at least one jamming beam whose diameter is less than the diameter of an optical aperture of the IR-sensitive homing head of the missile; and
   the IR jamming system includes means for directing said jamming beam onto said optical aperture of said IR sensitive homing head in such a manner that only a portion of said optical aperture is illuminated, whereby said jamming beam is scattered within said homing head, in a manner that depends on a specifically illuminated area of said optical aperture and on an angle of incidence of said jamming beam, thereby precluding derivation of correct angle information for said jamming beam.

2. The IR jamming system according to claim 1, wherein the at least one jamming beam is produced by at least one coherent light source.

3. The IR jamming system according to claim 1, wherein:
   the jamming system produces a plurality of jamming beams; and
   the jamming beams form a two-dimensional pattern.

4. The IR jamming system according to claim 3, wherein an array of optical fibres are connected at least one of their ends to a high-power laser and at their other end to a lens system which produces the two-dimensional pattern of the jamming beams.

5. The IR jamming system according to claim 3 wherein a plurality of mutually interleaved patterns of IR jamming beams are provided at different wavelengths.

6. The IR jamming system according to claim 3 wherein the two-dimensional pattern of jamming beams is produced by diffraction of the radiation from a coherent source on a different structure.

7. The IR jamming system according to claim 3 wherein the two-dimensional pattern of the jamming beams is produced by interference of radiation from at least two coherent sources.

8. The IR jamming system according to claim 1 wherein the jamming system includes a high-speed scanning system which scans a single high-power jamming beam, in azimuth and elevation.

9. The IR jamming system according to claim 1 wherein the system includes a high-speed scanning system which scans a row of medium-power jamming emitters, in at least one of azimuth and elevation.

10. The IR jamming system according to claim 1, further comprising one of a laser tracker and a radar tracker for aligning the jamming beam or beams.

11. A jamming method for defense against a missile with an IR-sensitive homing head, by transmission of jamming radiation, said method comprising:
generating at least one jamming beam; and
causing the at least one jamming beam to illuminate an area of an optical aperture of the IR-sensitive homing head of the missile, which area is smaller than said optical aperture, whereby said jamming beam is scattered within said homing head, in a manner that depends on a specifically illuminated area of said optical aperture and on an angle of incidence of said jamming beam, thereby precluding derivation of correct angle information for said jamming beam.

12. An IR jamming system for defense against a missile having an IR sensitive homing head, said system comprising:
a source of IR radiation;
optical means for forming an IR radiation into a jamming beam; and
means for directing said jamming beam onto an optical aperture of said IR sensitive homing head in such a manner that only a portion of said optical aperture is illuminated, whereby said jamming beam is scattered within said homing head, in a manner that depends on a specifically illuminated area of said optical aperture and on an angle of incidence of said jamming beam, thereby precluding derivation of correct angle information for said jamming beam.

\* \* \* \* \*